United States Patent [19]
Gerber

[11] 3,959,613
[45] May 25, 1976

[54] ELECTRIC LOCK

[75] Inventor: Richard W. Gerber, Des Moines, Iowa

[73] Assignee: Gerber Electronic Lock, Inc., Des Moines, Iowa

[22] Filed: Feb. 10, 1975

[21] Appl. No.: 548,528

Related U.S. Application Data

[60] Continuation-in-part of Ser. No. 401,991, Oct. 1, 1973, Pat. No. 3,873,891, which is a division of Ser. No. 214,675, Jan. 3, 1972, Pat. No. 3,793,500.

[52] U.S. Cl. .................................................. 200/44
[51] Int. Cl.[2] .......................................... B60N 25/04
[58] Field of Search ........... 200/44, 42; 307/10 AT, 307/10 R; 340/64; 317/134, 135 A

[56] References Cited

UNITED STATES PATENTS

| | | | |
|---|---|---|---|
| 3,348,220 | 10/1967 | Luna et al. | 200/44 X |
| 3,415,087 | 12/1968 | Kramasz, Jr. et al. | 200/44 X |
| 3,793,500 | 2/1974 | Gerber | 200/44 |
| 3,873,891 | 3/1975 | Gerber | 317/234 |

*Primary Examiner*—Herman Hohauser
*Attorney, Agent, or Firm*—Zarley, McKee, Thomte, Voorhees & Sease

[57] ABSTRACT

The electric lock of the present invention comprises two sets of contact assemblies mounted within a housing, one of the sets being responsive to a master key, and the other being responsive to a pass key for opening the lock. The assemblies each comprise a set of opening contacts corresponding to the protrusions on the keys and a set of alarm contacts positioned to set off an alarm in the event the wrong key is used or in the event an attempt is made to pick the lock.

20 Claims, 15 Drawing Figures

ELECTRIC LOCK

CROSS REFERENCES TO RELATED APPLICATIONS

This application is a continuation-in-part of application Ser. No. 401,991, filed Oct. 1, 1973, now U.S. Pat. No. 3,873,891 which in turn is a division of application Ser. No. 214,675, filed Jan. 3, 1972, now U.S. Pat. No. 3,793,500, dated Feb. 19, 1974.

SUMMARY OF THE INVENTION

This invention relates generally to electric locks. Previous electric locks suffer from several disadvantages. They utilize special factory-made keys which cannot be readily duplicated. Often they use complicated pin tumbler systems to foil lock-picking attempts by unauthorized persons. Furthermore, they are often complicated and expensive to manufacture.

The electric lock disclosed in U.S. Pat. No. 3,793,500 improves upon these prior art devices by utilizing a standard easily duplicated key. Furthermore, it eliminates the need for pin tumbler systems by utilizing a plurality of electrical contacts which actuate an electrical circuit whenever the key engages all or most of the contacts. It provides a simple, inexpensive method for effecting both the unlock function and the security, or alarm function, both through the use of flexible electrical contacts.

The present invention utilizes a pick-proof feature involving a series of alarm contacts which are in protective covering relationship over the opening contacts so as to prevent an incorrect key from engaging the opening contacts without first engaging the alarm contacts. Furthermore, a timing mechanism is within the electrical circuitry of the device for causing an alarm to be actuated in the event that all or most of the opening contacts are not engaged within a predetermined period of time. Thus, if a burglar were to attempt to pick the lock by engaging the contacts one at a time, the timing mechanism would actuate the alarm unless all or most of the contacts were engaged within a predetermined period of time, preferably one-fourth of a second.

The present invention also adopts a master key set of contacts similar to the contacts utilized for pass keys. The master key assembly also includes alarm contacts similar to the ones previously described for the pass key. A pair of wards within the lock assembly insure that only a master key can be moved into engagement with the master contact assembly, and that only a pass key can be moved into engagement with the master contact assembly.

A reset feature is also included in the present invention for permitting the alarm to be reset in the event it is accidentally discharged. The alarm may be reset by turning the correct key in the lock three times to the opening position. A counter in the electrical circuit senses the third movement of the key to the correct opening position, and automatically shuts off the alarm and opens the lock.

Another important feature of the present invention is the simplicity with which the contacts may be removed and replaced with contacts having a different configuration. This is advantageous in the event it is desirable to change the lock so as to fit a different key. The contact assemblies may be easily removed and replaced with new contact assemblies.

In view of the foregoing, one of the objects of the present invention is the provision of an electric lock.

A further object of the present invention is the provision of a device which utilizes an easily duplicatable key.

A further object of the present invention is the provision of a device which utilizes an alarm-triggering device which will set off an alarm whenever the wrong key is utilized in the lock.

A further object of the present invention is the provision of a device which utilizes an alarm-triggering mechanism for setting off an alarm whenever an attempt it made to pick the lock.

A further object of the present invention is the provision of a device which includes two circuits: One for a regular pass key, and one for a master key.

A further object of the present invention is the provision of a device which includes a mechanism for preventing the master key from engaging the pass key contacts and for preventing the pass key from engaging the master key contacts.

A further object of the present invention is the provision of a device which includes easily removable and replaceable contact assemblies so as to simplify changing the lock to fit different keys.

A further object of the present invention is the provision of a lock which includes a timing device for setting off an alarm whenever the various contacts are not closed within a predetermined interval of time.

A further object of the present invention is the provision of a lock which includes a reset device for permitting the operator of the lock to shut off the alarm and open the lock with the correct key in the event of accidental actuation of the alarm.

A further object of the present invention is the provision of a device which eliminates the necessity for tumblers within the lock and greatly simplifies the internal structure of the lock.

A further object of the present invention is the provision of a lock which can be utilized in any device that requires a lock including vehicles, safes, home or apartment doors, and the like.

A further object of the present invention is the provision of a device which is economical to manufacture and durable in use.

BRIEF DESCRIPTION OF THE VIEWS OF THE DRAWINGS.

This invention consists in the construction, arrangements and combination of the various parts of the device, whereby the objects contemplated are attained as hereinafter more fully set forth, specifically pointed out in the claims, and illustrated in the accompanying drawings in which:

DETAILED DESCRIPTION

Figure 1:
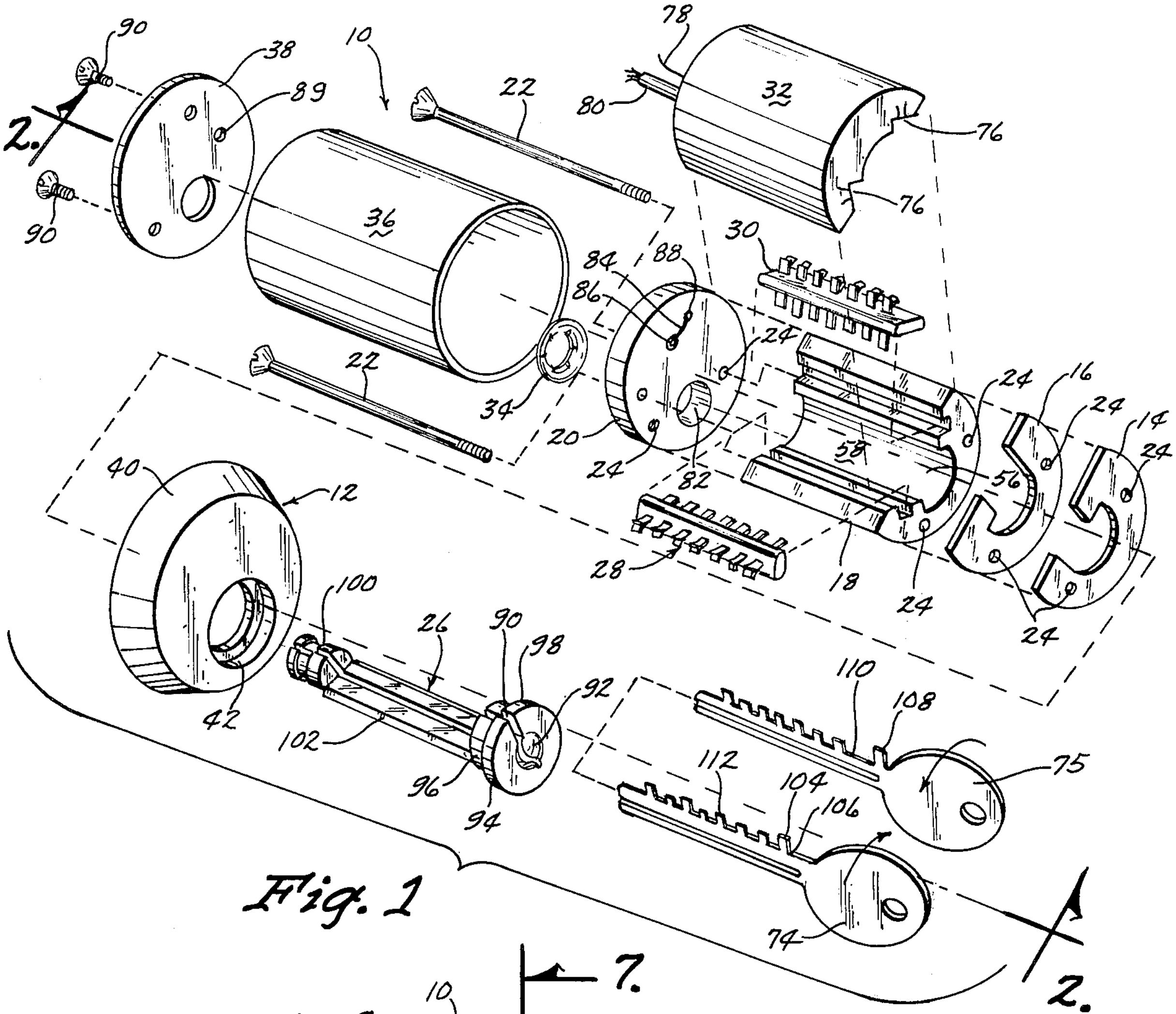
FIG. 1 is an exploded perspective view of the device of the present invention.

Referring to the drawings the numeral 10 refers generally to the locking device of the present invention. Device 10 includes a front plate 12 to which are secured a master ward 14, a pass ward 16, a cylinder block 18, and a rear plate 20, all by means of a pair of elongated screws 22. Screws 22 extend through registered holes 24 in rear plate 20, block 18, and pass wards 14, 16 so as to secure these components rigidly to front plate 12. Other components of device 10 which are shown in FIG. 1 are a rotatable cradle 26, a master contact assembly 28, a pass key contact assembly 30, an electrical connector 32, a metal clip 34, a cover cylinder 36 and a cover plate 38.

Front plate 12 includes a beveled edge 40. A bore 42 extends through plate 12 and includes a conterbore 44 (FIG. 2) which forms an outwardly presented shoulder 46.

Mounted immediately rearwardly of front plate 12 are master ward 14 and pass ward 16. Wards 14–16 are identical in structure, but are symmetrically arranged. Master ward 14 includes a J-shaped cut out portion 48 (FIG. 7) which includes a righthand shoulder 50 adjacent its upper margin. Pass ward 16 includes a J-shaped cut out portion 52 (FIG. 6) which is the reversed image of J-shaped portion 48 and which includes a lefthand shoulder 54 adjacent its upper margin.

Figure 4:
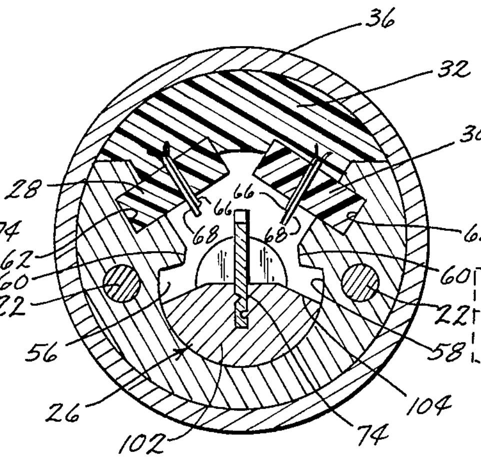

Mounted rearwardly of wards 14 and 16 is cylinder block 18. Cylinder block 18 includes a central bore 56 (FIG. 4) having a cylindrical bearing surface 58 which extends slightly more than 180° as viewed in cross section (FIG. 4). As viewed in cross section, a pair of inwardly projecting shoulders 60 are positioned adjacent the upper margin of bearing surface 58. Extending longitudinally in cylinder block 18 are a pair of longitudinal grooves 62 adapted to receive master contact assembly 28 and pass key contact assembly 30.

Figure 9:
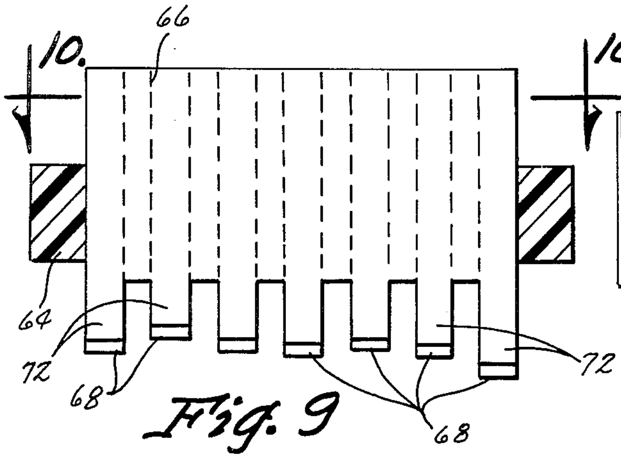
FIG. 9 is an enlarged sectional view of the contact assembly utilized in the present invention.
Figure 10:
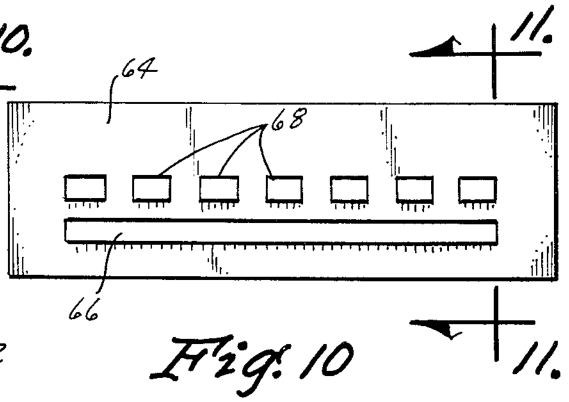
FIG. 10 is a sectional view taken along line 10—10 of FIG. 9.
Figure 11:
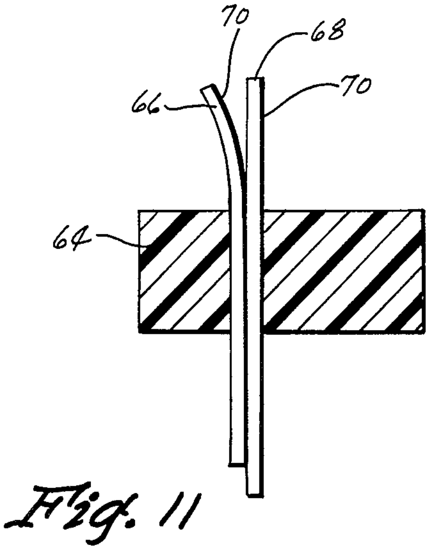
FIG. 11 is a sectional view taken along line 11—11 of FIG. 10.

Contact assemblies 28, 30 are shown in FIGS. 9–11. They each comprise a dielectric block 64 having embedded therein an alarm contact 66 and a plurality of opening contacts 68. Contacts 66 and 68 each include on one surface thereof an insulative coating 70, and contacts 66–68 are arranged so that insulative coating 70 of alarm contact 66 is interposed between alarm contact 66 and the uncoated surface of opening contact 68. This insures that alarm contact 66 is electrically insulated from opening contact 68.

Opening contacts 68 are separated by the insulative material of block 64 so that each contact 68 is electrically independent from the other. In contrast alarm contact 66 includes a plurality of downwardly projecting fingers 72, but these fingers 72 are integral with contact 66 so as to provide a single electrical unit. Alarm contact 66 is superimposed over opening contacts 68 so that all but the very lowest tips of contacts 68 are covered by alarm contact 66.

Master contact assembly 28 and pass key contact assembly 30 are identical in regard to the above-described structure, with the only difference being that the lower end of opening contacts 68 are arranged in different predetermined patterns so that a master key such as key 75 (FIG. 1) will correspond to the protrusions on the master contact assembly 28 and a pass key such as pass key 75 will correspond to the protrusions on pass key contact assembly 30.

Alarm contacts 66 and opening contacts 68 extend upwardly above block 64 and are bent to spread outwardly in diverging fashion from one another as shown in FIG. 11. Connector 32 includes a plurality of receptacles 76 in its undersurface adapted to receive the diverging contacts 66, 68 of both contact assemblies 28, 30. Connector 32 includes an internal circuitry which connects both alarm contacts 66 of contact assemblies 28, 30 to a single alarm wire lead 78 and which connects each individual opening contact 68 to a strand of wire within a pigtail 80. Thus, all of the alarm contacts are in electrical connection with alarm wire 78, whereas each of the individual opening contacts 68 are connected to a separate lead wire within pigtail 80.

Contact assemblies 28, 30 are plugged into receptacles 76 of connector 32, and the connector and contact assemblies are then mounted as a unit to cylinder block 18 by sliding blocks 64 of contact assemblies 28, 30 within grooves 62 of cylinder block 18 as illustrated in FIG. 4.

Figure 2:
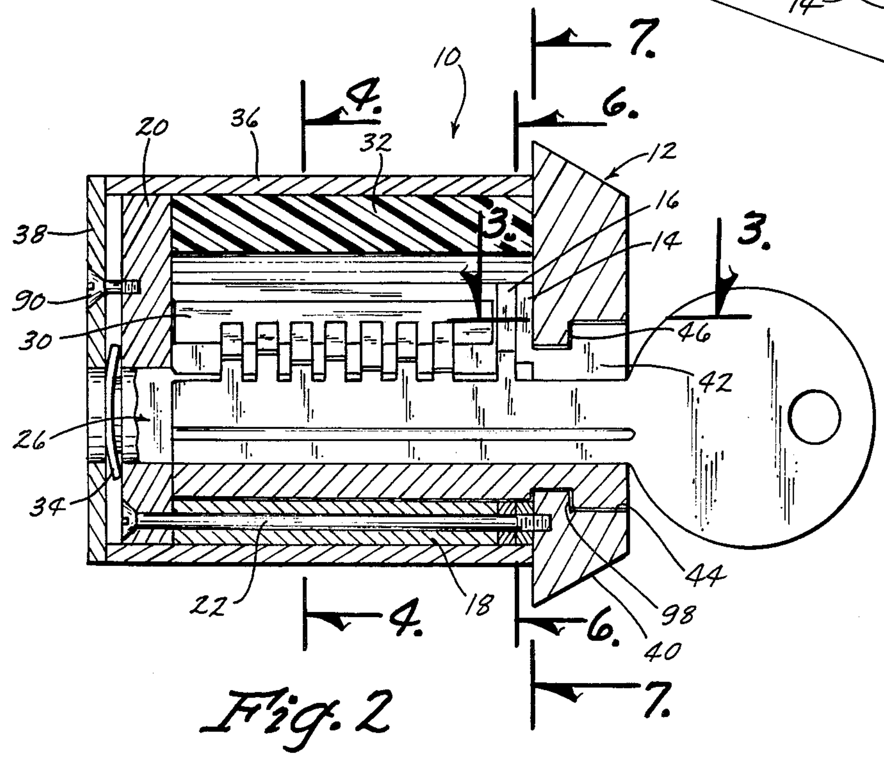
FIG. 2 is a sectional view of the assembled device of the present invention taken along line 2—2 of FIG. 1.

Rear plate 20 is mounted rearwardly of cylinder block 18 and is secured in place by means of elongated screws 22. Rear plate 20 includes a large bore 82 therein which is in registered alignment with cylindrical bearing surface 58 of cylinder block 18. A ground wire 84 is operatively connected by means of a screw 86 to rear plate 20 and extends outwardly through a wire lead hole 88. Hole 88 also receives pigtail 80 and alarm wire 78 from connector 32. Cover plate 38 also includes a lead wire hole 89 which is in registered alignment with hole 88 of rear plate 20. Cover cylinder 36 is slidably mounted over connector 32 and cylinder block 18 and abuts against front plate 12. Cover plate 38 is then placed over rear plate 20 and is fastened thereto by means of screws 90 as shown in FIG. 2, thereby holding cover cylinder 36 against front plate 12.

Rotatable cradle 26 is slidably inserted within central bore 56 of cylinder block 18 and is adapted to rotate therein. Cradle 26 includes an elongated slot or keyway 90 which runs the length thereof and which is adapted to receive keys 74, 75. Cradle 26 includes a conventional broach 92 adjacent the front end of keyway 26. The forward end of cradle 26 includes a head 94 having a reduced diameter portion 96 which forms a rearwardly presented shoulder 98 adapted to engage shoulder 46 of plate 20 as shown in FIG. 2. The rearward end of cradle 26 includes an angular groove 100 which protrudes rearwardly from rear plate 20 and which is adapted to receive clip 34 for holding cradle 26 within locking device 10.

Cradle 26 thus is held against longitudinal movement within device 10 but is free to rotate. While not shown in the drawings, it is possible to utilize a spring to spring bias cradle 26 to a neutral position wherein keyway 90 is vertically disposed. While such spring biasing is not necessary to the invention it may be preferable in certain applications.

Extending between groove 100 and head 94 of cradle 26 is a shank portion 102. In cross section shank portion 102 includes upwardly presented bearing surfaces 104 which are adapted to engage shoulders 60 (FIG. 4). Thus cradle 26 is movable from a neutral position wherein keyway 90 is vertically disposed to either left or right positions wherein surfaces 104 engage shoulders 60.

Figure 3:
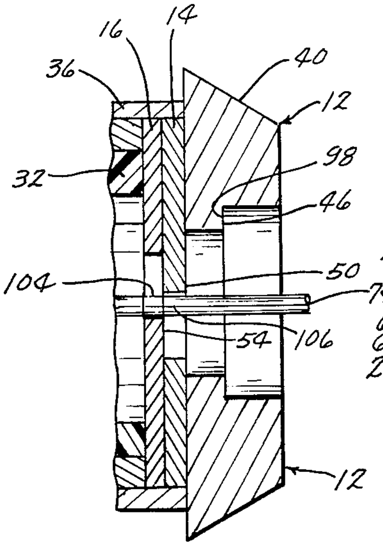
FIGS. 3 and 4 are sectional views taken along lines 3—3 and 4—4 respectively of FIG. 2.
Figure 6:
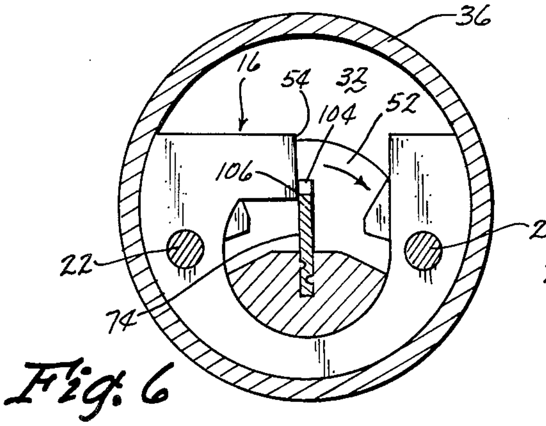
FIGS. 6 and 7 are sectional views taken along lines 6—6 and 7—7 of FIG. 2.
Figure 7:
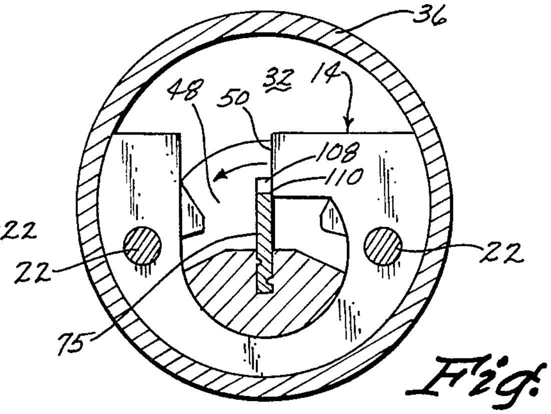

In operation of the above device, pass key 74 is inserted into key way 90 of rotatable cradle 26. Wards 14, 16 prevent key 74 from being inserted in any position other than a vertical position as shown in FIGS. 6 and 7. Pass key 74 is provided with a pass key protrusion 104 adapted to engage left hand shoulder 54 of pass ward 16 (FIG. 3 and 6) so as to prevent pass key 74 from turning to the left or counter clockwise from its vertical position. Adjacent pass key protrusion 104 is a pass key notch 106 which is adapted to register with right hand shoulder 50 of master ward 14 so as to permit key 74 to turn clockwise or to the right from its vertical position.

Master key 75 is provided with a master key protrusion 108 and a master key notch 110 which are positioned so that protrusion 108 engages the shoulder 50 of master ward 14 to prevent rotation of master key 75 to the right or clockwise (see FIG. 7). Notch 110 is registered with shoulder 54 of pass key ward 16 so as to permit master key 75 to turn counter clockwise or to the left from its vertical position.

Figure 5:
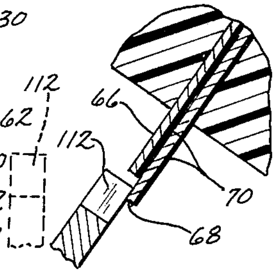
FIG. 5 is an enlarged, partial view of the contact assembly of the present invention.

After pass key 74 is inserted into key way 90 of cradle 26, the operator turns pass key 74 clockwise or to the right as viewed in FIGS. 4 and 5. Pass key 74 includes a plurality of protrusions 112 which have a predetermined configuration corresponding to the configuration of opening contacts 68. The relationship of protrusions 112 to opening contacts 68 is such that when key 74 is turned to the right, protrusions 112 engage the lower tips of opening contacts 68 without engaging alarm contact 66. Alarm contact 66 covers all of opening contacts 68 except the lower tips thereof so that only a pass key 74 having the correct pattern of protrusions 112 can move into engagement with all of contact 68 without engaging any portion of alarm contact 66. If the wrong key is used, it either engages some of the alarm contacts 66 or it does not engage all of the lower tips of opening contacts 68.

Figure 8:
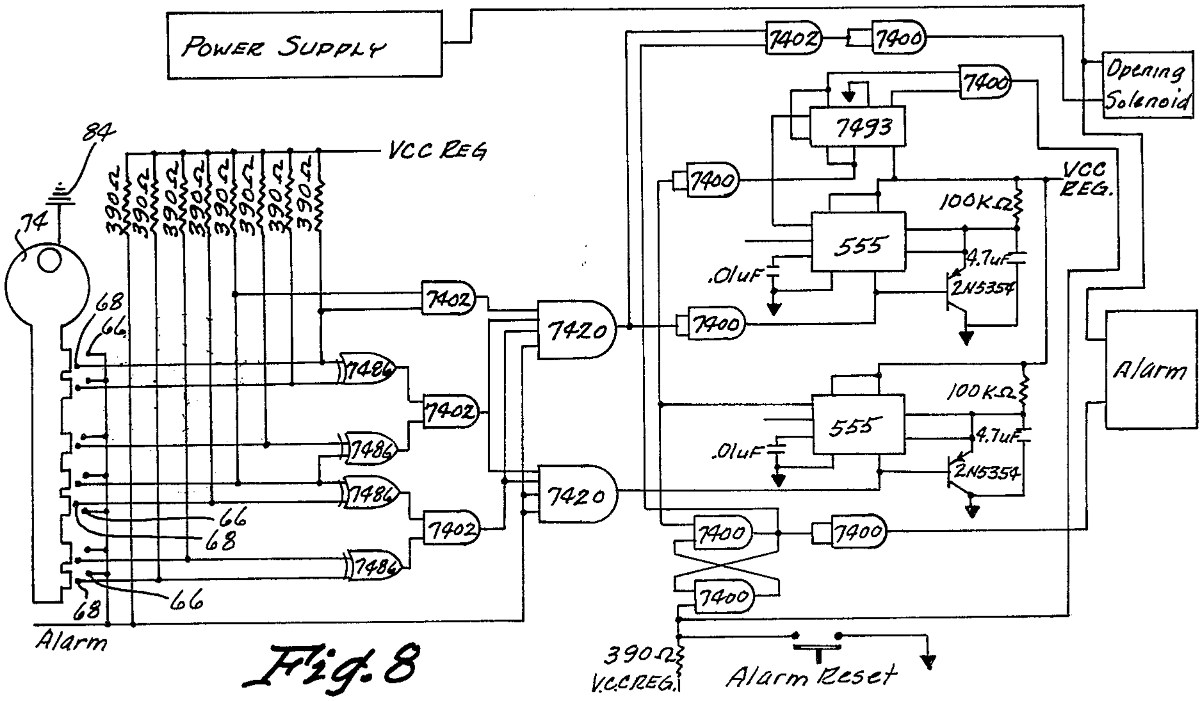
FIG. 8 is a schematic diagram of the electrical circuitry of the present invention.

Alarm contacts 66 and opening contacts 68 are connected to separate alarm and opening circuits respectively which are illustrated in the schematic diagram in FIG. 8. The various components of the circuit are illustrated with conventional symbols. A plurality of gates are shown in these circuits and these gates are identified by four digit numerals which are conventionally used in the art to identify the particular type of gate employed. Gates 7486 are exclusive-or gates. Gates 7402 are positive-nor gates. Gates 7420 are positive-nand gates. Gates 7400 are positive-nand gates. Component 7493 is a binary counter adapted to count to 3 for purposes which will be described hereinafter. Two timing devices are designated by the numerals 555. These timing devices are manufactured by Signetics Corporation, 8200 Humboldt Avenue South, Minneapolis, Minnesota.

When key 74 is inserted into key way 90, it is in electrical contact with ground wire 84 by virtue of the fact that rear plate 20, cylinder block 18, cradle 26, and key 74 are formed from electrically conductive materials. Thus when key 74 comes into engagement with opening contacts 68, it completes connection between opening contacts 68 and ground. Similarly, if key 74 engages alarm contacts 66 at any place, it will complete electrical connection between ground and these alarm contacts.

The circuitry in the left hand portion of FIG. 8 analyzes the signal generated by insertion of the key. Three sets of gates are used for this purpose: four 7486 gates, three 7402 gates, and two 7420 gates. Their purpose is to actuate the alarm in the event the alarm contacts are engaged, to open the lock if all or nearly all of the contacts are engaged, and to trigger the alarm in nearly all situations where some, but not all of the opening contacts are engaged.

Gates 7486 are exclusive-or gates. Their reaction depends upon whether or not their input terminals are connected to a low potential (ground) or a high potential. Normally the input terminals of gates 7486 are at a high potential, but when the key 74 connects them to ground 84 they are converted to a low potential. The manner in which gates 7486 react may be summarized by the following chart:

| First Input Terminal | Second Input Terminal | Output Terminal |
|---|---|---|
| Low | Low | Low |
| High | High | Low |
| Low | High | High |
| High | Low | High |

The 7402 gates are positive-nor gates and react as follows:

| First Input | Second Input | Output |
|---|---|---|
| Low | Low | High |
| High | High | Low |
| High | Low | Low |
| Low | High | Low |

The 7420 gates and 7400 gates are positive-nand gates and react as follows:

| Inputs | Outputs |
|---|---|
| All High | Low |
| One or more low | High |

Figure 12:
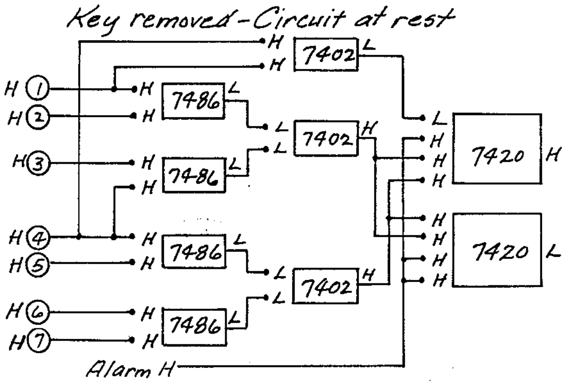
Figure 15:
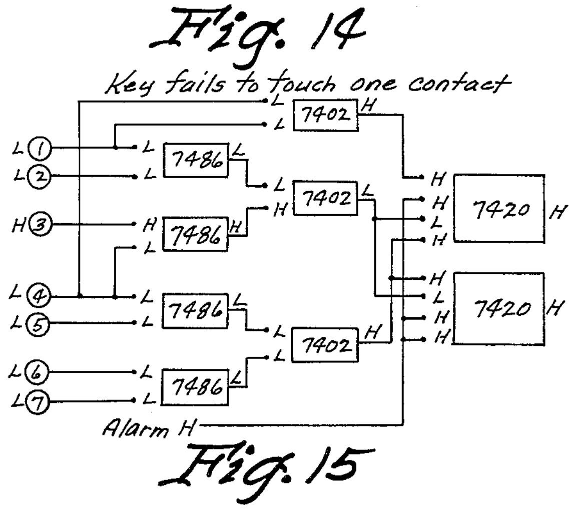

Examples of the manner in which these components analyze the signal are illustrated in FIGS. 12–15. FIG. 12 illustrates a normal condition wherein the key is removed from the lock. In this condition contacts 1–6 are in an open circuit, or high potential, condition. The resulting output signal from the two 7420 gates is thus high for the upper 7420 gate and low for the lower 7420 gate. The remainder of the circuit responds to this high-low normal condition by remaining at rest so as to prevent the door lock from being opened.

Figure 13:
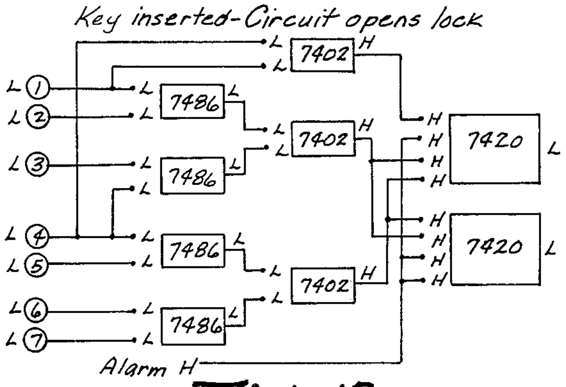
FIGS. 12–15 are schematic views illustrating the manner in which the circuit analyzes the signal produced by the key.

FIG. 13 illustrates the open condition for opening the lock. Both 7420 gates have a low output signal in this situation. This low-low output from the two 7420 gates actuates the remainder of the circuit to cause the lock to be opened. When the key engages contacts 68, it completes electrical connection between the contacts and ground thereby causing a low potential condition at each contact grounded. As can be seen in FIG. 13, the low potential of all the grounded contacts results in the low-low output from the two 7420 gates.

Figure 14:
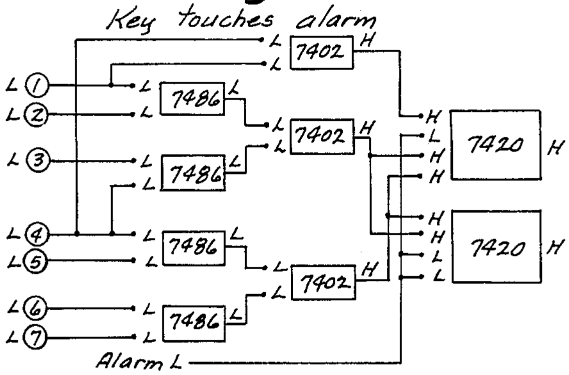

FIG. 14 illustrates what happens whenever the key touches an alarm contact 66 and connects it to ground. The grounded alarm contact is connected to the inputs of the both 7420 gates, and therefore causes both 7420 gates to have high outputs. A high-high output from the two 7420 gates triggers an alarm condition in the remainder of the circuit which results in actuation of the alarm.

The alarm condition (two high outputs from the 7420 gates) can also result if some, but not all, of the opening contacts are engaged by the key. For example, in FIG. 15 a situation is shown where the key engages all of the contacts except number 3. This results in a high-high output condition from the two 7420 gates which in turn causes actuation of the alarm.

The configuration in FIGS. 8 and 12–15 may be varied without detracting from the invention. For example, it would be possible to utilize only one opening contact instead of seven, as shown. Of course, as the number of contacts is increased, the difficulty in picking the lock is also increased.

It is also not absolutely necessary that the circuitry creates an alarm condition in every possible situation where less than all the opening contacts are engaged. For example, in the modification of FIGS. 12–15, an alarm condition would not result if the key engaged the first five contacts, but not the last two. Preferably, however, the circuitry should result in an alarm condition in most situations where the key engages some but not all of the contacts.

The circuitry of FIG. 8 causes the alarm to be actuated in most situations where all of the contacts 68 are not engaged within a given interval of time. Timing devices 555 cooperate with the series of gates to determine whether or not the opening contacts have been engaged within the predetermined interval of time. Preferably this interval of time is approximately one-fourth of a second. Thus if a key is inserted which engages only one or two of the contacts, the alarm will be actuated.

Binary counter 7493 permits the alarm to be reset in the event of accidental triggering. If, for example, the operator inserts the wrong key accidentally into the lock and actuates the alarm, the operator can reset the alarm as follows:

The operator, having actuated the alarm, inserts the correct key and moves it to the operative position engaging all of contacts 68. The key is then moved to its vertical position and returned again to its operative position two more times. Counter 7493 counts each time the key is moved into engagement with contact 68, and upon engagement the third time, counter 7493 causes the alarm to be deactuated and causes opening solenoid to be actuated to open the lock.

The circuitry for master contact assembly 28 is identical to that shown in FIG. 8. The only difference between master contact assembly 28 and pass key contact assembly 30 is the pattern formed by the lower tips of opening contacts 68. The protrusions on master contact assembly 28 are adapted to correspond to master key 75 whereas the protrusions on pass key contact assembly 30 are adapted to correspond to the protrusions on pass key 74. Wards 14, 16 prevent the master key from being moved toward pass key contact assembly and also prevent the pass key from being moved accidentally towards the master key contact assembly 28.

In the event that it is desired to change the lock to conform to either a new master key or a new pass key, it is merely necessary to replace master contact assembly 28 or pass key contact assembly 30 as desired. For example, if a new pass key assembly is required, cover cylinder 36 and cover plate 38 are removed. Next rear plate 20 is removed so as to permit electrical connector 32 with contact assemblies 28, 30 to be removed as an integral piece. Pass key contact assembly 30 is then removed from connector 32 and the new pass key contact assembly is inserted therein. The device is then reassembled and the lock has been changed to accommodate a new pass key.

The present invention provides many advantages over previous electric locks. The keys for the present invention are easily duplicatable and do not require complicated electrical devices as in previous electric locks. The alarm of the present invention is very difficult to avoid in the event an attempt is made to pick the lock or to use an incorrect key. It is also not possible to pick the lock by engaging the contacts one at a time because timing device 555 will actuate the alarm in the event all or nearly all of the contacts are not engaged within one-fourth of a second. The device also is advantageous in that it provides a simple system for accommodating both a pass key and a master key. It also permits the easy change of either the pass key contact assembly or the master key contact assembly. Furthermore, the device permits the operator to reset the alarm with the correct key in the event that the alarm is accidentally triggered. The device eliminates completely the necessity for tumblers within the lock and therefore greatly simplifies the internal structure of the device over previous electric locks. The lock of the present invention can be utilized in virtually any device that requires a lock including vehicles, safes, home or apartment doors, and the like. It is economical to manufacture and is durable in use. Thus it can be seen that the device accomplishes at least all of its stated objectives.

What is claimed is:

1. A lock actuating mechanism comprising:

a housing having outer walls defining a chamber;

a key having a predetermined pattern of protrusions thereon;

a key receiving member having a keyway therein adapted to receive said key, said receiving member being movably mounted within said housing for moving said key between first and second positions within said chamber;

a set of unlock contacts positioned within said housing to be engaged by said protrusions of said key whenever said key is in said second position;

a set of alarm contacts being between said key and said unlock set of contacts whenever said key is in said first position;

said alarm set of contacts being positioned within said housing in a predetermined pattern related to said unlock set of contacts in such a manner that only a key having the same predetermined pattern of protrusions as said key will move from said first position to said second position without engaging at least one of said alarm set of contacts;

a first electrical circuit connected to said unlock set of contacts;

a second electrical circuit including an alarm therein connected to said alarm set of contacts; and a timing mechanism in said first circuit and connected to said alarm, said timing mechanism being actuated by connection of one of said unlock contacts to ground and being adapted to actuate said alarm in said second circuit whenever said predetermined number of said unlock contacts are not grounded within a predetermined interval of time after one of said unlock contacts are grounded.

2. A lock actuating mechanism according to claim 1 wherein said key receiving member is rotatably mounted within said housing.

3. A mechanism according to claim 2 wherein said first electrical circuit includes an electrically actuated power means adapted to be actuated whenever said key engages a predetermined number of said contacts.

4. A lock mechanism according to claim 3 wherein said key is made from an electrically conductive material, said first circuit being adapted to remain in an open circuit condition until said key engages said predetermined number of said first contacts.

5. A lock mechanism according to claim 1 wherein said first and second sets of contacts comprise a plurality of elongated contact members, each of said contact members having a distal end, said second set of contacts being approximately superimposed in covering relation over said first set of contacts so as to leave only said distal ends of said contact members of said first set exposed to said key.

6. A mechanism according to claim 1 wherein said second set of contacts are superimposed over said first set of contacts in covering relationship thereto so as to expose only a portion of each of said first contacts to said key as said key moves from said first to said second positions.

7. A mechanism according to claim 6 wherein said first set of contacts includes a plurality of spaced apart metallic fingers arranged in approximately the same plane and having exposed end portions not covered by said second set of contacts, said first and second contacts being arranged in facing relationship and being separated by a layer of dielectric material.

8. A lock actuating mechanism comprising:
- a housing having outer walls defining a chamber;
- a pass key having a predetermined pattern of protrusions thereon;
- a master key having a second predetermined pattern of protrusions thereon;
- a key receiving member having a keyway therein adapted to receive said keys, said receiving member being rotatably mounted within said housing for moving said keys between first, second and third positions within said chamber;
- a first set of contacts positioned within said housing to be engaged by said protrusions of said pass key whenever said pass key is in said second position;
- a second set of contacts positioned within said housing in a predetermined pattern related to said first set of contacts in such a manner that only a key having the same predetermined pattern of protrusions as said pass key will move from said first position to said second position without engaging at least one of said second set of contacts;
- a third set of contacts positioned within said housing to be engaged by the protrusions of said master key whenever said master key is turned to said third position;
- a fourth set of contacts positioned within said housing in a predetermined pattern related to said third set of contacts in such a manner that only a key having the same predetermined pattern of protrusions as said master key will move from said first position to said third position without engaging at least one of said fourth set of contacts;
- a first electrical circuit connected to said first and third sets of contacts;
- a second electrical circuit connected to said second and fourth sets of contacts.

9. A lock actuating mechanism according to claim 8 wherein said first & second sets of contacts are mounted on a pass key contact assembly and said third and fourth sets of contacts are mounted on a master key contact assembly, said contact assemblies being detachably mounted within said housing.

10. A lock actuating mechanism according to claim 9 wherein said contact assemblies each include a block member and said housing includes a pair of longitudinal grooves for slidably receiving said block members.

11. A lock actuating mechanism according to claim 9 wherein pass ward means are within said housing for preventing said master key from moving to said second position and master ward means are within said housing for preventing said pass key from moving to said third position.

12. An electric lock comprising:
- first and second sets of flexible, electrical contacts, the contacts of said first set being electrically insulated from each other;
- an easily duplicated pass key having protrusions thereon for engaging each of said contacts in said first set and engaging none of said contacts in said second set;
- first circuit means electrically connected to each of said contacts in said first set and responsive thereto for producing a first output signal upon engagement of a predetermined number of said first contacts by said protrusions; and
- second circuit means electrically connected to each of said contacts in said second set and responsive thereto for producing a second output signal upon engagement of any of said second contacts;
- a reset circuit electrically connected to said first and second circuits and being adapted to be actuated to shut off said second output signal, said reset circuit having a counter therein for sensing and counting repeated successive engagements between said key and said predetermined number of said first contacts, said counter being responsive to a predetermined number of said successive engagements to actuate said reset circuit.

13. An electric lock comprising:
- first and second sets of flexible, electrical contacts, the contacts of said first set being electrically insulated from each other;
- an easily duplicated pass key having protrusions thereon for engaging each of said contacts in said first set and engaging none of said contacts in said second set;
- first circuit means electrically connected to each of said contacts in said first set and responsive thereto for producing a first output signal upon engagement of a predetermined number of said first contacts by said protrusions;
- second circuit means electrically connected to each of said contacts in said second set and responsive thereto for producing a second output signal upon engagement of any of said second contacts;
- alarm means connected to said second circuit means;
- timing means within said first circuit means and said second circuit means for timing the interval of time between initial engagement of said key with at least one of said first set of contacts and engagement of said key with said predetermined number said first set of contacts, said timing means being connected to said alarm means for actuation thereof whenever said time interval exceeds a predetermined length of time.

14. An electric lock comprising:

a lock housing;

easily duplicated pass and master keys, each having protrusions thereon;

pass and master key contact arrays mounted within said housing and adapted, respectively, for engagement by one but not the other of said keys, each contact array comprising a set of unlock electrical contacts adapted for engagement by said protrusions on said keys, said contacts being insulated from each other, a set of alarm electrical contacts disposed proximate said unlock contacts but insulated therefrom;

a rotatable key guide located within said housing and adapted to receive said keys;

unlock circuit means electrically connected to each of said unlock contacts for producing an unlock signal upon insertion and rotation of one of said keys so as to engage a predetermined number of said unlock contacts in one of said arrays; and alarm circuit means electrically connected to at least one of said alarm contacts for producing an alarm signal upon engagement thereof.

15. An electric lock according to claim 14 further including timing circuit means electrically connected to each of said unlock contacts in an array for producing an alarm signal if the time elapsed between the engagement of one unlock contact and all unlock contacts in said array exceeds a predetermined limit.

16. An electric lock according to claim 14 wherein the alarm contacts in an array substantially but not completely cover the unlock contacts in that array.

17. An electric lock according to claim 14 further including counter circuit means electrically connected to each of said unlock contacts in an array for producing an alarm reset signal upon engagement of said predetermined number of said unlock contacts in said array a predetermined number of times.

18. An electric lock comprising:

a lock housing;

an easily duplicated key having protrusions thereon;

a set of flexible, electrical unlock contacts mounted in said housing and adapted for direct engagement by said protrusions, said contacts being insulated from each other;

a set of flexible, electrical alarm contacts mounted in said housing and disposed proximate said unlock contacts but insulated therefrom;

a rotatable key guide located within said housing and adapted to receive said key;

unlock circuit means electrically connected to each of said unlock contacts for producing an unlock signal upon insertion and rotation of said key so as to directly engage a predetermined number of said unlock contacts;

alarm circuit means electrically connected to at least one of said alarm contacts for producing an alarm signal upon engagement thereof; and timing circuit means electrically connected to each of said unlock contacts for producing an alarm signal if the time elapsed between the engagement of one unlock contact and said predetermined number of unlock contacts exceeds a predetermined limit.

19. An electric lock comprising:

a lock housing;

an easily duplicated key having protrusions thereon;

a set of flexible, electrical unlock contacts mounted in said housing and adapted for direct engagement by said protrusions, said contacts being insulated from each other;

a set of flexible, electrical alarm contacts mounted in said housing and disposed proximate said unlock contacts but insulated therefrom;

a rotatable key guide located within said housing and adapted to receive said key;

unlock circuit means electrically connected to each of said unlock contacts for producing an unlock signal upon insertion and rotation of said key so as to directly engage a predetermined number of said unlock contacts;

alarm circuit means electrically connected to at least one of said alarm contacts for producing an alarm signal upon engagement thereof; and counter circuit means electrically connected to each of said unlock contacts for producing an alarm reset signal upon engagement of said predetermined number of said unlock contacts a predetermined number of times.

20. An electric lock comprising:

a lock housing;

early duplicated pass and master keys, each having protrusions thereon;

easily removable pass and master key contact arrays mounted within said housing and adapted, respectively, for engagement by one but not the other of said keys, each contact array comprising a set of unlock electrical contacts adapted for engagement by said protrusions on said keys, said contacts being insulated from each other, a set of alarm electrical contacts disposed proximate said first set but insulated therefrom;

a rotatable key guide located within said housing and adapted to receive said keys;

unlock circuit means electrically connected to each of said unlock contacts for producing an unlock signal upon insertion and rotation of one of said keys so as to engage a predetermined number of the unlock contacts in one of said arrays;

alarm circuit means electrically connected to at least one of said alarm contacts for producing an alarm signal upon engagement thereof;

timing circuit means electrically connected to each of said unlock contacts in an array for producing an alarm signal if the time elapsed between the engagement of one unlock contact and said predetermined number of unlock contacts in said array exceeds a predetermined limit; and counter circuit means electrically connected to each of said unlock contacts in an array for producing an alarm reset signal upon engagement of said predetermined number of said unlock contacts in said array a predetermined number of times.

* * * * *